United States Patent [19]

Cates

[11] Patent Number: 4,482,949
[45] Date of Patent: Nov. 13, 1984

[54] UNIT FOR PRIORITIZING EARLIER AND LATER ARRIVING INPUT REQUESTS

[75] Inventor: Ronnie L. Cates, Tempe, Ariz.

[73] Assignee: Motorola, Inc., Schaumburg, Ill.

[21] Appl. No.: 284,757

[22] Filed: Jul. 20, 1981

[51] Int. Cl.³ .......................... G06F 3/04; G06F 9/46
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,023,143 | 5/1977 | Braustein | 364/200 |
| 4,181,934 | 1/1980 | Marenin | 364/200 |
| 4,224,678 | 9/1980 | Lynch et al. | 364/724 |
| 4,260,854 | 4/1981 | Kolodny et al. | 179/6.09 |
| 4,268,904 | 5/1981 | Suzuki et al. | 364/200 |
| 4,271,468 | 6/1981 | Christensen | 364/200 |
| 4,291,306 | 9/1981 | Kodama et al. | 340/744 |
| 4,298,982 | 11/1981 | Auerbach | 371/30 |
| 4,323,967 | 4/1982 | Peters et al. | 364/200 |
| 4,326,249 | 4/1982 | Godsey | 364/200 |
| 4,339,808 | 7/1982 | North | 364/900 |
| 4,375,639 | 3/1983 | Johnson, Jr. | 340/825.5 |

Primary Examiner—James D. Thomas
Assistant Examiner—Archie E. Williams, Jr.
Attorney, Agent, or Firm—Joe E. Barbee

[57] ABSTRACT

An interface unit is capable of interfacing a plurality of microprocessor units to a limited number of input/output devices or of interfacing a single microprocessor to a plurality of input/output devices. The interface unit uses a transparent latch to receive the input request. The output of the transparent latch is coupled to an encoder which provides an output to a decoder. The input requests are also coupled to a second encoder which provides an output to a comparator. The comparator compares the outputs between the encoders to determine if a subsequent request of a higher priority is received. If a subsequent request is of a higher priority than the present request being processed the present user will be overruled. One of the main features of the present invention is that the interface unit can operate in an asynchronous mode at a relatively high operating speed.

4 Claims, 2 Drawing Figures

UNIT FOR PRIORITIZING EARLIER AND LATER ARRIVING INPUT REQUESTS

BACKGROUND OF THE INVENTION

This invention relates, in general, to microprocessor interface units, and more particularly, to an asynchronous microprocessor interface unit.

It is often desirable to operate a plurality of microprocessors with a single input/output (I/O) unit; or it may be desirable to operate a single microprocessor with a plurality of input/output devices. In such cases, it is preferred that some microprocessors have priority over other microprocessors or in the case where multiple input/output units are used it is desirable that some I/Os have priority over others. Interface units to accomplish the above have been available in the past; however, such interface units operated in a synchronous manner and were relatively slow in operation.

With the asynchronous operation, the system containing the interface unit adapts itself to receipt of the data, whereas, with synchronous operation the information must be in a form compatible with fixed timing characteristics.

Accordingly, it is an object of the present invention to provide a new and improved asynchronous interface unit useful with the operation of a microprocessor.

Another object of the present invention is to provide an improved asynchronous microprocessor interface unit which operates at relatively high speeds.

Yet a further object of the present invention it is to provide a microprocessor interface unit which is asynchronous in operation and does not use a synchronous device.

SUMMARY OF THE INVENTION

The above and other objects and advantages of the present invention are provided by the use of a transparent latch to receive input requests to an interface unit. The outputs of the latch are coupled to a first priority encoder which provides a coded output representative of the highest priority input request. The output of the first priority encoder is coupled to a decoder which decodes the output from the first encoder and provides an output signal corresponding to the highest received input request. The input requests are also coupled to a second priority encoder which provides a coded output. A comparator is used to compare the outputs from the first and second encoders so that if a subsequent input request is received after the first priority encoder has granted or selected a device, the comparator will determine whether a later received input request has higher priority than the previous granted or received input request. The interface unit also has the capability of blocking the inputs to the transparent latch once an input request has been received so that a subsequent input request will not disturb the first priority encoder but instead will be processed by the second priority encoder and the comparator.

DETAILED DESCRIPTION OF THE DRAWINGS

Figure 1:
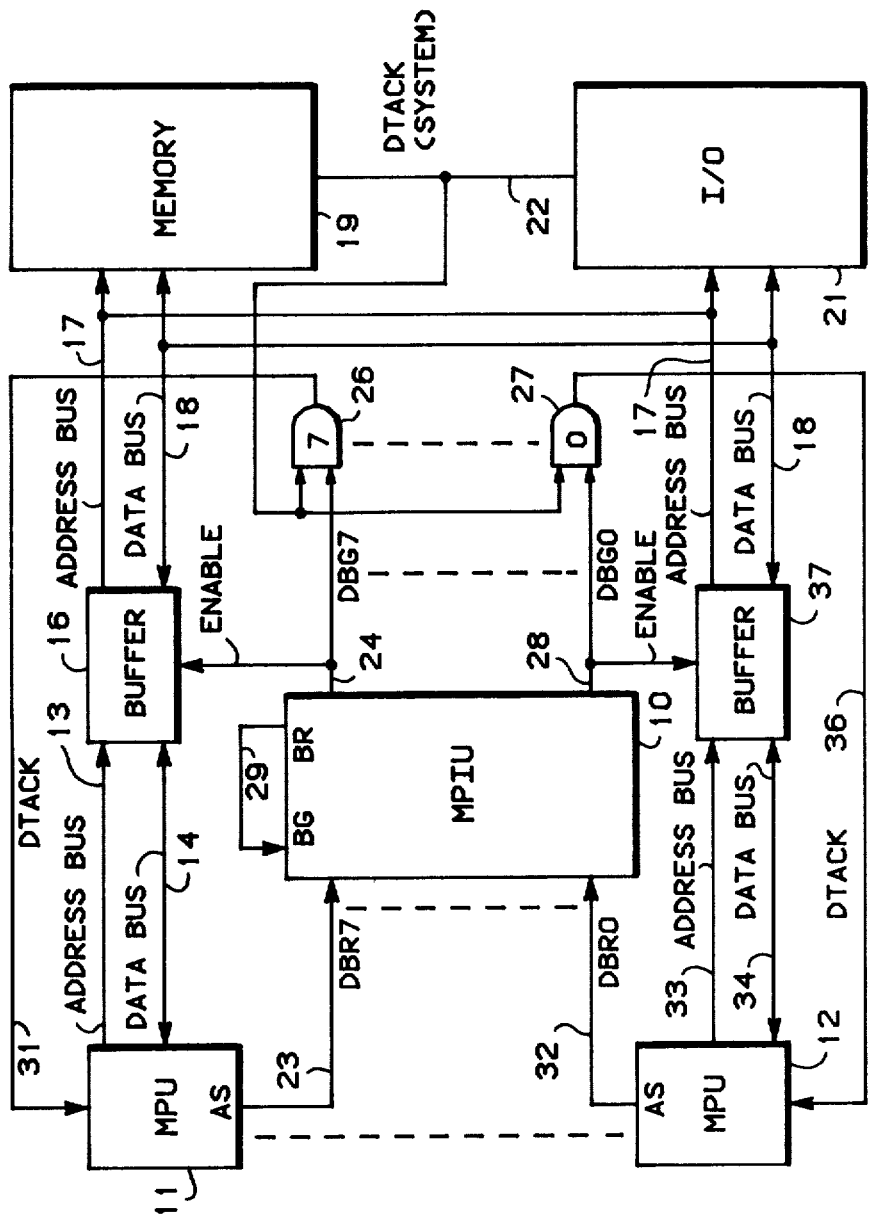
FIG. 1 illustrates in block diagram form the use of the microprocessor interface unit in conjunction with a plurality of microprocessor units.

Microprocessor interface unit 10 is illustrated as receiving eight data bus requests (DBR) 0 through 7. Microprocessor interface unit 10 is illustrated as providing eight data bus grants (DBG) 0 through 7. A bus request (BR) generated by microprocessor interface unit 10 is illustrated as being connected to a bus grant (BG) by line 29.

Only two microprocessor units 11 and 12 are illustrated, although it will be understood that eight microprocessors are required to provide the eight data bus request inputs to microprocessor interface unit 10. Microprocessor unit 11 has an address bus 13 and a data bus 14. Address bus 13 provides addresses to memory 19 while data bus 14 is used to couple data to and from microprocessor 11. Data bus 14 is coupled to data bus 18 by a buffer 16. Data bus 18 is connected to memory 19 and to input/output (I/O) unit 21. Buffer 16 also couples address bus 13 to address bus 17 which is connected to memory 19 and to I/O 21. Microprocessor unit 11 provides an address strobe (AS) signal on line 23 to microprocessor interface unit 10. The address strobe signal from microprocessor unit 11 serves as a data bus request (DBR). It is common for an address strobe of a microprocessor unit to indicate the start of a bus cycle. A data transfer acknowledge signal (DTACK) is coupled by line 31 from logic gate 26 to microprocessor unit 11. The data transfer acknowledge signal is generated by logic gate 26. Logic gate 26 has at least two inputs, one being the data bus grant (DBG) signal generated by microprocessor interface unit 10, and the other being a systems data transfer acknowledge signal generated by either memory 19 or input/output unit 21. The system data transfer acknowledge signal appearing on line 22 and coupled to an input of logic gate 26 signifies that data transfer is complete and MPU 11 no longer needs the bus. Data bus grant 7 generated by microprocessor interface unit 10 is also coupled to buffer 16 and serves as an enable signal for buffer 16. When buffer 16 is enabled address bus 13 is coupled to address bus 17 and data bus 14 is coupled to data bus 18.

Microprocessor unit 12 provides an address strobe on line 32 which serves as a data bus request to microprocessor unit 10. Since this is indicated to be the lowest priority data bus request, microprocessor interface unit 10 will only provide a data bus grant on line 28 if no higher data bus request is simultaneously present at the input of microprocessor interface unit 10. Microprocessor unit 12 provides address signals on address bus 33 and receives and provides data on data bus 34. Bus 33 and 34 are connected to buffer 37. When buffer 37 is enabled by data bus grant 0, address bus 33 is connected to address bus 17 and data bus 34 is connected to data bus 18. Data bus 17 is connected to memory 19 and to input/output unit 21. Data bus 18 is also connected to memory 19 and to input/output unit 21. Microprocessor unit 12 receives a data transfer acknowledge signal on line 36 from the output of a logic gate 27. Logic gate 27 receives an input signal from microprocessor interface unit 10 on line 28 and also receives a system data transfer acknowledge signal from line 22.

If the other microprocessor units were illustrated they would be connected in the same manner as microprocessor unit 11 and microprocessor unit 12. These unshown microprocessor units would supply device bus request 1 through 6 and would receive data transfer acknowledge signals from the logic gates not shown which would appear between logic gates 26 and 27. Although line 29 coupling BR to BG is shown as a direct connection, it will be understood that a slight delay in line 29 may be desirable. Such a delay can be accomplished by two series connected inverters, or the like.

Figure 2:
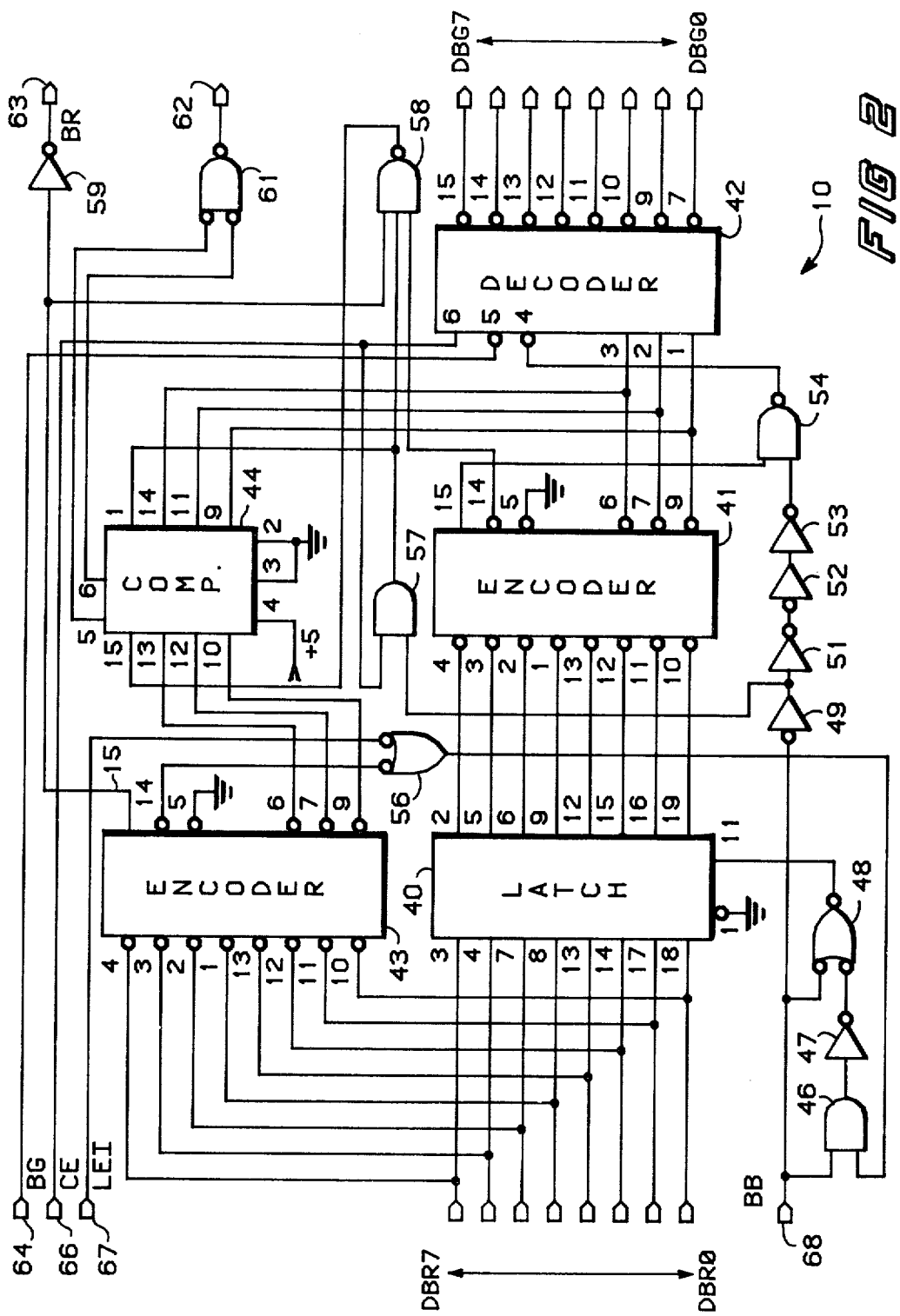
FIG. 2 shows in greater detail the microprocessor interface unit of the present invention.

Microprocessor interface unit 10 of FIG. 1 is shown in greater detail in FIG. 2. Device bus request 0 through 7 are shown coupled to a transparent latch 40 and to encoder 43. The device bus requests serve as input requests to microprocessor interface unit 10. Latch 40 is a transparent latch and contains eight flip-flops which appear transparent to the device bus request when the latch enable signal appearing on pin 11 of latch 40 is in a "high" state. When the latch enable signal on pin 11 makes a negative going transition the device bus requests at latch 40 are latched into the latch. The numbers appearing around latch 40 indicate the device pin numbers of such a latch. Pin 1 is grounded thereby making available at the output of the latches the signal that is latched in the flip-flops. The output pins of latch 40 are pins 2, 5, 6, 9, 12, 15, 16, and 19. The inputs to latch 40 are pins 3, 4, 7, 8, 13, 14, 17, and 18. The outputs of latch 40 are connected to encoder 41. Encoder 41 performs a priority decoding of the inputs to insure that the only the highest order device bus request is encoded. The encoded output appears in octal form on pins 6, 7, and 9 which are coupled to decoder 42 and to comparator 44. Decoder 42 decodes the output from encoder 41 and provides the decoded outputs as data bus grant DBG 0 through 7. The data bus grants are used as discussed hereinbefore in relationship to FIG. 1. The inputs to decoder 42 appear on pins 1, 2, and 3. The outputs from decoder 42 appear on pins 7, 9, 10, 11, 12, 13, 14, and 15. Pins 4, 5, and 6 receive inputs which are used by decoder 42 internally to gate the outputs. Pin 6 of decoder 42 receives chip enable (CE) and bus grant (BG) is received on pin 5. Pin 4 receives a signal which is a combination of bus busy and output enable generated by encoder 41.

Device bus request 7 through 0 are also received by encoder 43 which performs a priority encoding and provides the highest order input request in encoded form which is coupled to comparator 44. Comparator 44 compares the output of encoder 43 with the output of encoder 41 and provides outputs to logic gate 61 which generates a bus clear at terminal 62 if the request encoded by encoder 43 is a higher priority than the output of encoder 41.

Microprocessor interface unit 10 receives a chip enable (CE) signal on terminal 66 which is coupled to the input of an AND gate 57 and to pin 6 of decoder 42. A bus grant (BG) signal appears on terminal 64 which is coupled to pin 5 of decoder 42. A latch enable input (LEI) signal is provided to terminal 67 which is coupled to an input of logic gate 56. Also coupled to an input of logic gate 56 is an enable output from encoder 43. The output of logic gate 56 is coupled to an input of AND gate 46. A second input of AND gate 46 is a bus busy (BB) signal which is provided at terminal 68. The output of logic gate 46 is coupled by inverter 47 to an input of logic gate 48. The other input of logic gate 48 is connected to terminal 68 to receive the bus busy (BB) signal. The output of logic gate 48 is coupled to pin 11 of latch 40 which serves to open the latches or flip-flops in latch 40. The bus busy signal on terminal 68 is also connected to the input of inverter 49. The output of inverter 49 is connected to the input of inverter 51 and also to the input of logic gate 57. The output of inverter 51 is coupled to the input of inverter 53 by an inverter 52. Inverters 49, 51, 52, and 53 are used to provide a delay in the bus busy signal to the input of logic gate 54. The output of inverter 53 is connected to an input of NAND gate 54. A second input of NAND gate 54 is connected to pin 15 of encoder 41. The output of NAND gate 54 is connected to pin 4 of decoder 42. The output of AND gate 57 is connected to pin 1 of comparator 44 and to an input of NAND gate 58. NAND gate 58 also receives an input from pin 14 of encoder 41 and a third input from pin 15 of encoder 43. The output of NAND gate 58 is connected to pin 15 of comparator 44. Outputs of comparator 44 are provided on pins 5 and 6. A comparison is made by comparator 44 between the inputs on pins 1 and 15 which is used to control internal logic to comparator 44. An output from pin 5 of comparator 44 is connected to an input of logic gate 61. A second input of logic gate 61 is provided by pin 6 of comparator 44. The output of logic gate 61 is connected to terminal 62 which provides a bus clear signal. Pin 15 from encoder 43 is also coupled to terminal 63 by inverter 59. Terminal 63 provides the bus request (BR) signal for microprocessor interface unit 10.

A latch enable input signal provided on terminal 67 can be used when more than one microprocessor interface units 10 are cascaded in order to control more than eight microprocessors. Encoder 43 generates the bus request signal on terminal 63 and continues to monitor input requests to determine whether a later received input request is higher than an input request encoded by encoder 41. Therefore comparator 44 compares priority between a current user versus current requesters. The bus busy signal appearing at terminal 68 is like a bus grant acknowledge signal and allows a current user to hold the bus. Transparent latch 40 is extremely instrumental in allowing microprocessor interface unit 10 to operate in an asynchronous mode and also helps increase the operating speed of unit 10. This is one of the main differences between microprocessor interface unit 10 and the prior art. In addition, the prior art microprocessor interface unit used a parallel out serial shift register to provide a clock signal for D flip-flops which were used in place of transparent latch 40. This type of a setup, of course, contributed to the relatively slow operating speed of the prior art. Microprocessor interface unit 10 is expected to operate at a speed of approximately 50 nanoseconds from receipt of data bus request to the bus grant out.

Microprocessor interface unit 10 can also be used to interface a single microprocessor unit to a plurality of I/O devices. In such a case the I/O devices would provide request inputs to inputs DBR7 through DBR0 and interface unit 10 would provide its outputs on DBG7 through DBG0. In addition, the bus request (BR) signal generated by interface unit 10 would be connected to the single microprocessor while the bus grant (BG) signal would be provided by the microprocessor to interface unit 10. The bus busy (BB) signal would be generated by the I/O devices.

By now it should be appreciated that there has been provided a new and improved microprocessor interface unit which is capable of operating in an asynchronous mode at a relatively high speed. In a preferred embodiment, interface unit 10 is intended to be integrated on a single semiconductor chip using TTL. By way of example only, transparent latch 40 is equivalent to TTL circuit 74LS373, encoders 41 and 43 are equivalent to TTL circuits 74LS148, comparator 44 is equivalent to TTL circuit 74LS85, and decoder 42 is equivalent to TTL circuit 74LS138. The pin assignments designated on these components correspond to the pin assignments of the equivalent TTL circuits.

I claim:

1. An asynchronous microprocessor interface unit, comprising: a transparent latch for receiving input requests; a first priority encoder coupled to the latch for determining which input request received by the latch has priority and providing a coded output; a decoder coupled to the first priority encoder to decode the coded output and providing a decoded output; a second priority encoder for also receiving the input requests and providing a coded output corresponding to the highest priority input request received; and a comparator coupled to the first and second encoders for comparing the outputs of the first and second encoders to establish a priority therebetween so that a later arriving input request which has a higher priority than an input request already processed by the first encoder can be determined.

2. The asynchronous microprocessor interface unit of claim 1 wherein the transparent latch comprises a plurality of latching means.

3. The asynchronous microprocessor interface unit of claim 1 further including means for closing the transparent latch once an input request has been received to prevent a subsequent input request from interfering.

4. An asynchronous interface unit capable of interfacing a plurality of data processors to a bus coupled to an input/output device and also capable of interfacing a single data processor to a plurality of input/output devices wherein the interfacing is done on a priority basis, the asynchronous interface unit comprising: a transparent latch for receiving input requests; a first encoder for encoding a highest priority input request received, the first encoder having an input coupled to the transparent latch and providing an encoded output; a decoder coupled to the first encoder for decoding the encoded output, a second encoder having inputs for receiving the input requests and providing outputs; and a comparator for comparing the outputs of the first and second encoders to determine whether an input request received by the second encoder is of a higher priority than the input request encoded by the first encoder; and means for closing the transparent latch so that arbitration process can be performed without interference from later arriving input request changes at the transparent latch.

* * * * *